P. JOYCE.

Coffin Bier.

No. 3,512. Reissued June 22, 1869.

WITNESSES

Geo Maxi
J. J. Ott

INVENTOR

Patrick Joyce
per Thos. A. Kennedy
attorneys

N. PETERS. Photo-Lithographer. Washington, D. C.

United States Patent Office.

PATRICK JOYCE, OF ROCHESTER, NEW YORK.

*Letters Patent No.* 87,570, *dated March* 9, 1869; *reissue No.* 3,512, *dated June* 22, 1869.

IMPROVEMENT IN COFFIN-BIERS.

The Schedule referred to in these Letters Patent and making part of the same.

*To all whom it may concern:*

Be it known that I, PATRICK JOYCE, of Rochester, in the county of Monroe, and State of New York, have invented certain new and useful Improvements in Coffin-Biers; and I do hereby declare the following to be a full, clear, and exact description of the same, reference being had to the accompanying drawing, forming part of this specification, in which—

Figure 1:
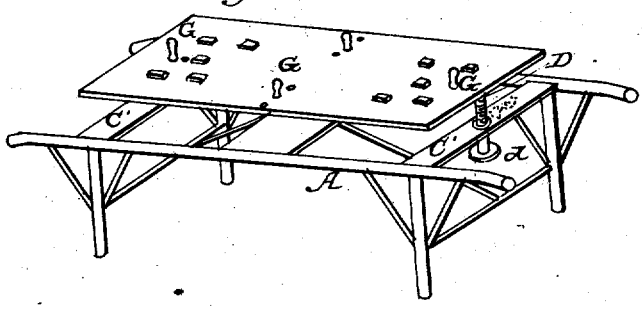
Figure 1 is a perspective view of a bier, illustrating the nature of my invention.
Figure 2:
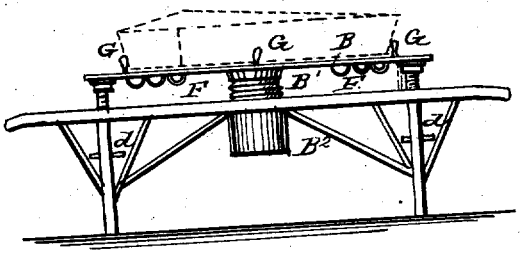
Figure 2 is a side view of the same.

The purpose of this invention is, chiefly, to provide a bier, or other coffin-support, with a wholly or partially-revolving platform, upon which the coffin rests, so that when it is necessary to reverse or otherwise change the position of the coffin on the bier, it may be done without the usual inconvenience of lifting and carrying the coffin or bier.

It also relates to providing a suitable means of elevating the coffin, to adapt it to the height of pews in different churches, or other requirements, in order to give the attendants an opportunity of seeing the same, &c.

In the accompanying drawing, to which the following description refers—

A is the coffin-bier.

B, the platform upon which the coffin rests, having a screw, or pivot, $B^1$, on the under side, working in a nut, or box, $B^2$, fixed in the central cross-board C′ of the bier.

D D are movable screws, working vertically within nuts in the end cross-boards C′ C′.

The platform will revolve either with a screw or pivot-point in the centre. When a screw is employed, the platform will be moved around and elevated by one and the same device. When the pivot is used, the platform is raised from the ends by means of the screws C′ C′.

F are friction-rollers, journalled at each end of the platform, and extending through slots a little above its upper face, so that the coffin may be easily rolled thereon.

G are pins placed in holes at the ends and sides of the platform, to secure the coffin in place while the bier is being carried or moved.

I have thus described a particular style of bier, constructed on the principle of my invention. But I do not mean to confine myself to any exactness of form or arrangement, as I am fully aware that other and various means might be adopted for obtaining a like result.

The main idea I have in view is in relation, generally to a revolving platform or coffin-support, and the raising of the same by such means as may be found most convenient or desirable, the particular details of form and arrangement being supplied according to the suggestions of experience, propriety, or taste.

Having fully described my invention,

I claim—

1. The employment, in connection with a coffin-bier or other coffin-holder, or support, of a wholly or partially-revolving platform, or equivalent, for the purpose set forth 2. In combination with a wholly or partially-revolving platform, or equivalent, as described, so arranging the same that it may be elevated to any desired height, for the purpose specified.

3. In combination with a coffin-bier, or other coffin-holder, or support, provided with a wholly or partially-revolving platform, or equivalent, the screws D, or equivalents, for elevating the same, for the purpose specified.

4. In combination with a bier or other coffin-holder, having a wholly or partially-revolving platform, the hinged block to support and strengthen the platform, when said platform is revolved and elevated by means of a central screw-pivot.

PATRICK JOYCE.

Witnesses:

PATRICK MCINTYRE,

C. H. ELETSON.